United States Patent [19]
Holt

[11] Patent Number: 5,696,921
[45] Date of Patent: Dec. 9, 1997

[54] SYSTEM AND METHOD FOR ALLOCATING A WRITE REQUEST ON THE SAME CYLINDER AS A MOST RECENT READ REQUEST ON A ROTATING MEMORY

[75] Inventor: Nicholas Peter Holt, Cheshire, United Kingdom

[73] Assignee: International Computers Limited, Putney, United Kingdom

[21] Appl. No.: 794,117

[22] Filed: Nov. 15, 1991

[30] Foreign Application Priority Data

Dec. 11, 1990 [GB] United Kingdom ............... 9026917

[51] Int. Cl.[6] .......................... G06F 12/10; G06F 12/00
[52] U.S. Cl. .................... 395/404; 395/439; 395/412; 395/872
[58] Field of Search ................... 395/425, 275, 395/575, 400, 525, 439, 404, 412, 872; 365/200

[56] References Cited

U.S. PATENT DOCUMENTS

| | | | |
|---|---|---|---|
| 5,065,354 | 11/1991 | Jons et al. | 395/182.03 |
| 5,146,571 | 9/1992 | Logan | 395/182.06 |
| 5,179,684 | 1/1993 | Tohchi et al. | 395/438 |
| 5,210,716 | 5/1993 | Takada | 365/185.09 |

*Primary Examiner*—Eddie P. Chan
*Assistant Examiner*—Reginald Bragdon
*Attorney, Agent, or Firm*—Lee, Mann, Smith, McWilliams, Sweeney & Ohlson

[57] ABSTRACT

A rotating memory system (e.g. a disk memory) in which a write request is allocated a physical block preferentially on the cylinder on which read/write heads are currently located. This reduces the amount of head movement and hence speeds up the access time. A block map is maintained to convert between the logical block numbers used by read and write requests and the physical block numbers which identify the physical locations of the blocks in the memory.

6 Claims, 2 Drawing Sheets

SYSTEM AND METHOD FOR ALLOCATING A WRITE REQUEST ON THE SAME CYLINDER AS A MOST RECENT READ REQUEST ON A ROTATING MEMORY

BACKGROUND OF THE INVENTION

This invention relates to rotating memory systems such as disk memory systems. More specifically, the invention is concerned with a memory system in which data is stored on one or more rotating members (such as magnetic disks) and can be accessed by means of one or more movable read/write heads.

In such a system, when it is required to access a particular block of data, it is generally necessary to move the heads so as to position them over the cylinder that contains the desired block. (The term "cylinder" is used herein to denote the portion of the memory that can be accessed by the heads in any given position of the heads. In a disk drive with multiple disks and multiple heads, a cylinder consists of one track from each disk. In a single disk system, the cylinder degenerates to a single track). However, movement of the head is relatively slow, and when such movement is necessary, the access speed is severely reduced.

The object of the present invention is to reduce the amount of head movement required in such a system, and hence to speed up the operation of the system.

SUMMARY OF THE INVENTION

According to the invention there is provided a rotating memory system in which data is stored on at least one rotating member and accessed by at least one moveable read/write head, the memory holding a plurality of blocks of data in each of a plurality of cylinders, each block having a physical block number, the system, being arranged to execute read and write requests, each of which contains a logical block number identifying a block to be written or read, wherein the system maintains a block map for converting the logical block numbers to physical block numbers, and wherein in response to a write request, the system allocates a physical block to the write request, preferentially on the cylinder at which the heads are currently positioned.

It can be seen that if, for example, read and write accesses alternate, each write will take place preferentially to the same cylinder as the preceding read access. This substantially reduces the amount of head movement required, and allows the write time to be effectively masked by the read time.

It is important to ensure that free space is evenly distributed across the cylinders, and that this evenness is maintained. However, if write accesses are always made to the same cylinder as the preceding read access, there is a positive feedback effect: the more likely data is to be read from a cylinder, the more likely it is to be written into that cylinder, thus increasing further the probability of a read access from that cylinder. As a result, there is tendency for the blocks to form clusters, leaving the disk with cylinders that are either full or empty.

In a preferred form of the invention, this clustering effect can be reduced or avoided by reducing the preference for the cylinder on which the heads are currently positioned when the number of unallocated blocks in that cylinder drops below a predetermined threshold value.

DESCRIPTION OF AN EMBODIMENT OF THE INVENTION

One disk memory system in accordance with the invention will now be described by way of example with reference to the accompanying drawings.

Figure 1:
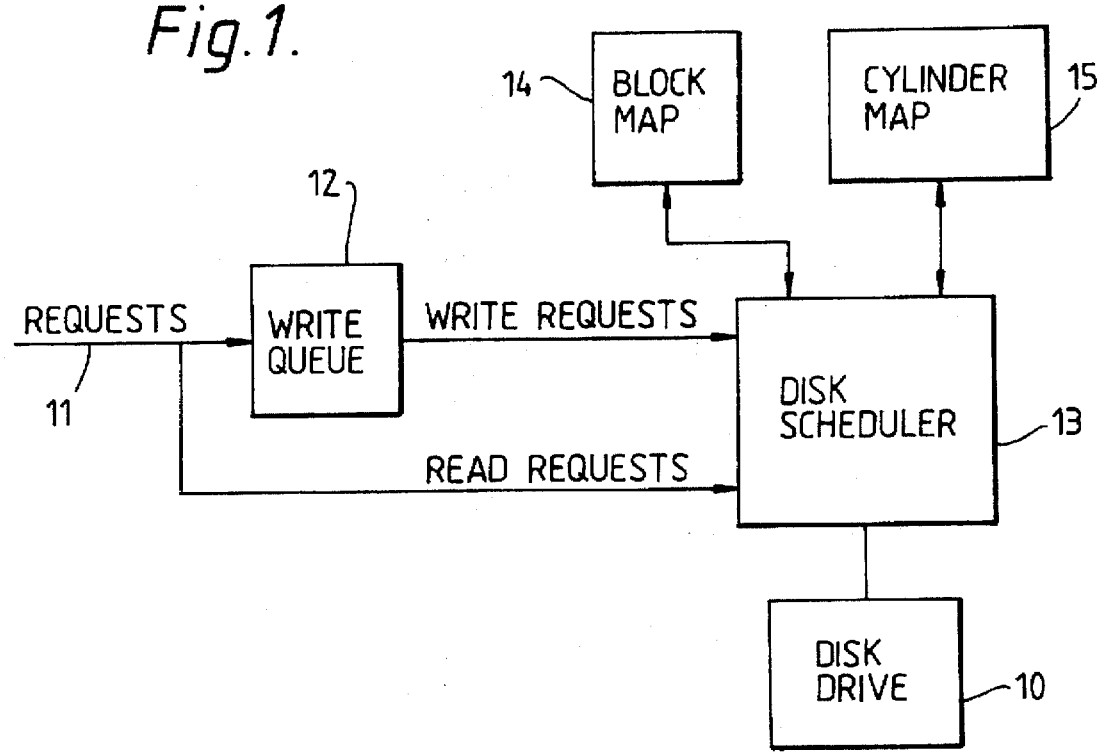
FIG. 1 is a block diagram of a disk memory system embodying the invention

Referring to FIG. 1, the disk memory system comprises a disk drive unit 10, holding one or more magnetic disks, with moveable read/write heads for reading and writing data from selected areas of the disks. In this example, the disk drive unit has 500 cylinders (i.e. possible head positions), each cylinder holds 1000 data blocks, and each block comprises 2 Kbytes of data. Thus, the total capacity of the disk drive is 1 Gbyte. Each data block has a physical block number which uniquely identifies the position of that block in the memory.

The disk memory system receives read and write requests over an input path 11, for example from a central processing unit (not shown). Each request includes a logical block number identifying a logical block to which data is to be written or from which data is to be read. The way in which these logical blocks are associated with the physical blocks in the disk drive unit will be described later.

Write requests are placed in a write queue 12. This comprises a non-volatile memory which buffers a number of write requests, along with the data to be written. In this example, the write queue 12 holds up to 20 write requests.

The system also includes a disk scheduler 13. The disk scheduler receives the read requests from the input path 11, and the write requests from the write queue 12, and decides how these are to be handled by the disk drive 10. The disk scheduler also has access to a block map 14 and a cylinder map 15.

The block map 14 is a table, held in non-volatile memory, which maps the logical block numbers to physical block numbers, indicating the actual position of the blocks on the disk. The reverse mapping, from physical to logical block numbers, is not required.

The cylinder map 15 is a table which holds, for each cylinder, a free block count indicating the number of free (unallocated) blocks in that cylinder, and a list of the physical block numbers of the free blocks.

Figure 2:
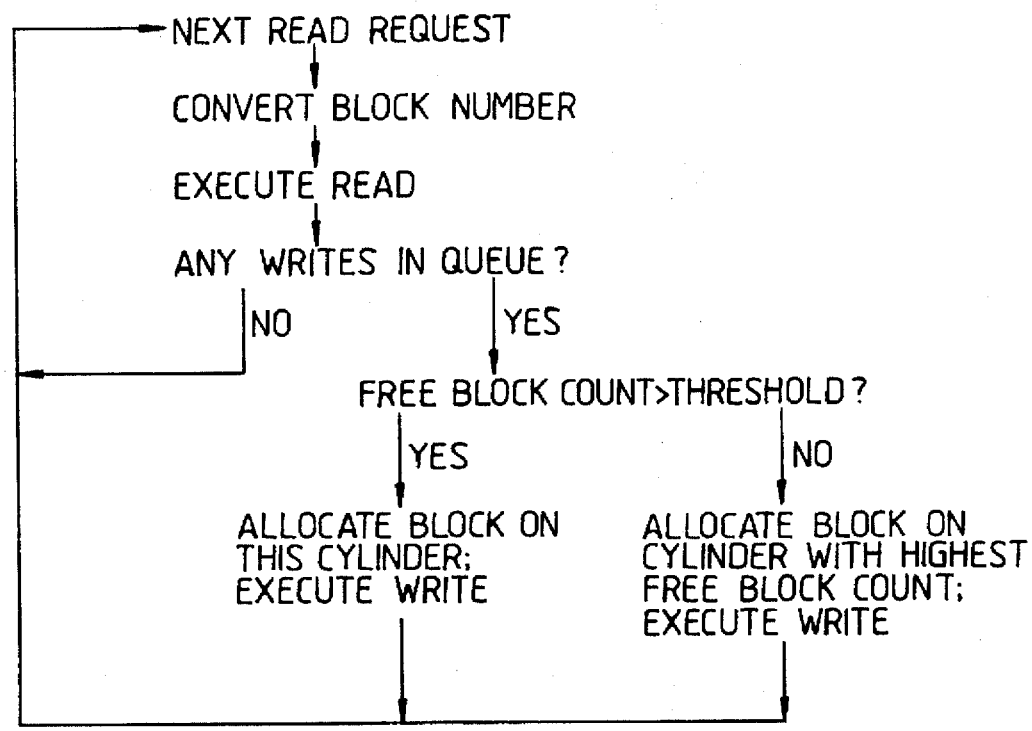
FIG. 2 is a flow chart showing the operation of a disk scheduler forming part of the system

Referring now to FIG. 2, this shows the operation of the disk scheduler 13 in response to a read request.

The first action of the disk scheduler is to consult the block map, to convert the logical block number in the read request to the corresponding physical block number. The block can then be accessed and read. This may involve movement of the heads to position them on the cylinder containing the desired block.

When the read request has been serviced, the disk scheduler inspects the write queue 12. If there are no write requests in the queue, the disk scheduler returns and waits for the next read request. If, however, there is at least one write request in the queue, the scheduler examines the cylinder map 15 to find the free block count of the current cylinder (i.e. the cylinder which has just been accessed by the read request, and on which the heads are currently positioned).

The free block count of the current cylinder is compared with a predetermined threshold value, representing the average number of free blocks per cylinder. If the free block count is greater than the threshold value, a free block is allocated from the current cylinder, and the write operation is performed to that block.

The allocation of a block involves the following actions. First, the cylinder map 15 is consulted to find a free block in the current cylinder. The cylinder map is then updated to indicate that this block is no longer free, and the free block count for this cylinder is decremented. Also, the block map 14 is updated, to indicate that the physical block number of the allocated block is now associated with the logical block number contained in the write request. Also, if another physical block was already associated with this logical block number, that block is deallocated, by updating the block map and cylinder map.

The disk scheduler then returns and waits for the next read request.

If, on the other hand, it is found that the free block count of the current cylinder is less than or equal to the threshold level, the disk scheduler searches the cylinder map 15 to find the cylinder with the highest free block count. A block is then allocated from this cylinder, and the write is performed to that block.

In summary, it can be seen that each write request is preferentially allocated a block on the same cylinder as the preceding read request, so that no head movement is required to execute the write request. Thus, the access time for the write request is effectively masked by that for the read request. If, however, the cylinder is becoming too full, the write request is diverted to another cylinder. This avoids excessive clustering in the allocation of blocks, and hence ensures a more even distribution of the blocks between the cylinder.

Because of the way in which blocks are allocated, a logical block does not have any permanent location on the disk. The block map keeps track of the physical locations of the logical blocks.

Figure 3:
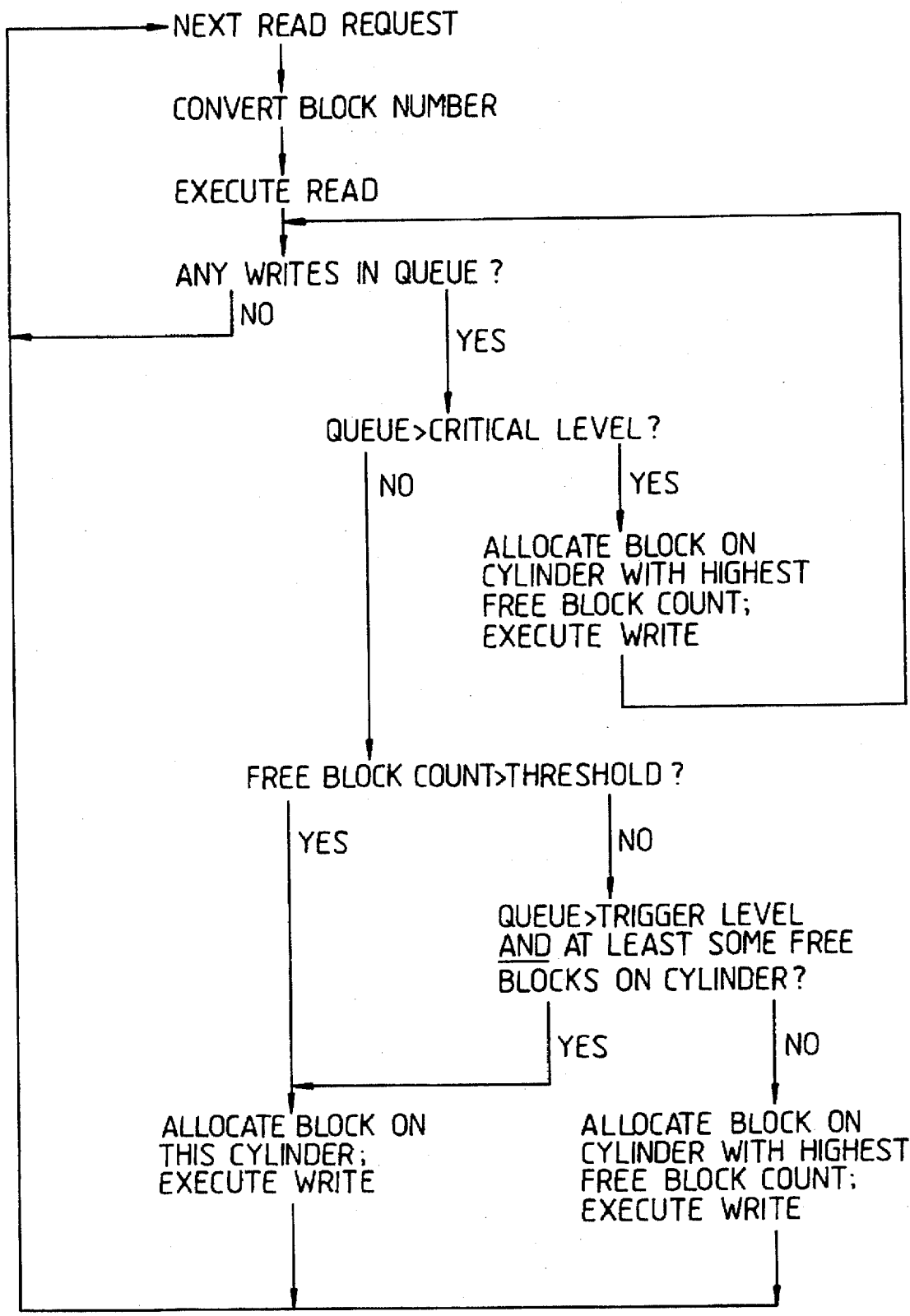
FIG. 3 is a flow chart showing the operation of a modified version of the disk scheduler.

Referring now to FIG. 3, this shows a modification of the arrangement in FIG. 2.

In this modification, a predetermined "trigger" level is defined for the number of requests currently in the write queue 12. In this example, the trigger level is 4. While the number of requests in the write queue is less than or equal to this trigger level, the disk scheduler operates in the same way as described above with reference to FIG. 2. However, if the number of requests in the write queue becomes greater than the trigger level, the disk scheduler changes its strategy for allocating blocks: it allocates a block in the current cylinder, irrespective of the value of the free block count, provided only that there are some free blocks in this cylinder.

It is found that this modification reduces the amount of head movement still further, without leading to excessive clustering.

Another modification shown in FIG. 3 is that a predetermined "critical" levels is defined for the number of write requests in the write queue. In this example, the critical level is 16.

If the number of write requests in the queue is greater than this critical level, this indicated that the write queue is becoming excessively full, and immediate action has to be taken to reduce the size of the queue. A block is allocated in the cylinder with the highest free block count, and a write request is executed, to perform a write to this block. This is repeated until the number of write requests in the queue returns to a level no greater than the critical level.

Many other modifications may be made to the arrangement described above without departing from the scope of the present invention. For example, the disk memory system may include more than one disk drive unit 10. In this case, the mapping of logical to physical blocks may be arranged to span all the disk drives, so that a logical block can reside on any drive. This increases the chances that some drive will be on a cylinder with unallocated blocks when a write is requested, and hence reduces still further the write latency. In association with conventional mirroring or plexing of the disk drives, such an arrangement would have a write performance approaching that of disk array systems, while retaining the multiple independent read access advantages of individual disks, as well as providing resilience to failures.

In transaction systems, it is frequently required to read a block, update it, and then write it back to the disk. In the system described above, when the updated block is written back to the disk, it is, in general, allocated a different physical block on the disk, and the old physical block is deallocated; that is, the mapping between logical blocks and physical blocks is altered.

In another possible modification, the block map may be enhanced to contain the previous mapping as well as the current one. This preserves a "before-look" for the transactions: i.e. the state of the data prior to the transaction. The disk scheduler may then either commit the transaction, by deallocating the before-look blocks, or abort it, by deallocating the newly written blocks and restoring the previous mapping.

Disk memory systems interfaced using SCSI (Small computer system interface) have an undefined internal layout in terms of tracks, cylinders etc. and all blocks are accessed using a relative block number. This makes it difficult to determine which physical blocks are located on the same cylinder. However, the smaller difference between the relative block numbers of two blocks, the more likely it is that these two blocks are located on the same cylinder.

In this case, therefore, the arrangement described above may be modified so that, when a write request is serviced, it is allocated a free block with the nearest relative block number to the block that has just been read. This maximises the probability that the block will be on the same cylinder.

I claim:

1. A rotating memory system comprising:
   (a) at least one rotating data storage member, having a plurality of blocks of data in each of a plurality of cylinders, each block having a physical block number;
   (b) at least one moveable read/write head for accessing said data;
   (c) means for executing read and write requests, each request containing a logical block number identifying a block to be written or read;
   (d) means for maintaining a block map for converting the logical block numbers to physical block numbers;

(e) means for checking, in response to a write request, the number of unallocated blocks on a cylinder at which the heads are currently positioned; and (f) means for allocating a block on that cylinder to be written to in the event that said number of unallocated blocks is greater than a predetermined threshold value.

2. A system according to claim 1 including means for holding write requests in a queue while waiting to be executed.

3. A system according to claim 2 including means for allocating a block on a current cylinder when the number of write requests in the queue is greater than a predetermined trigger level.

4. A method for storing data on at least one rotating data storage member in a rotating memory system accessed by at least one moveable read/write head and holding a plurality of blocks of data in each of a plurality of cylinders, each block having a physical block number, the method comprising:

(a) executing read and write requests, each request containing a logical block number identifying a block to be written or read;

(b) maintaining a block map for converting the logical numbers to physical block numbers;

(c) checking, in response to a write request, the number of unallocated blocks on a cylinder at which the heads are currently positioned; and (d) allocating a block on that cylinder to be written to in the event that said number of unallocated blocks is greater than a predetermined threshold value.

5. A method according to claim 4 wherein write requests are held in a queue while waiting to be executed.

6. A method according to claim 5 wherein a write request is allocated a block on the current cylinder when the number of write requests in the queue is greater than a predetermined trigger level.

* * * * *